(12) United States Patent
Cretors

(10) Patent No.: US 11,930,967 B2
(45) Date of Patent: Mar. 19, 2024

(54) FOOD HEATERS, SUCH AS FOR USE IN HEATING HOT DOGS

(71) Applicant: C. Cretors & Company, Wood Dale, IL (US)

(72) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 818 days.

(21) Appl. No.: 16/812,334

(22) Filed: Mar. 8, 2020

(65) Prior Publication Data

US 2020/0315402 A1 Oct. 8, 2020

Related U.S. Application Data

(60) Provisional application No. 62/815,614, filed on Mar. 8, 2019.

(51) Int. Cl.
  *A47J 43/08* (2006.01)
  *A47J 37/04* (2006.01)
  *H05B 6/12* (2006.01)

(52) U.S. Cl.
  CPC ............. *A47J 43/08* (2013.01); *A47J 37/048* (2013.01); *H05B 6/1209* (2013.01)

(58) Field of Classification Search
  CPC ....... H05B 6/1209; A47J 37/048; A47J 43/08; G07F 17/0078
  See application file for complete search history.

(56) References Cited

U.S. PATENT DOCUMENTS

| 884,771 A | 4/1908 | Snow |
| 1,251,291 A | 12/1917 | Scheeffer |
| 1,308,241 A | 7/1919 | Hutchinson |

(Continued)

FOREIGN PATENT DOCUMENTS

| CN | 2363205 Y | 2/2000 |
| CN | 2865302 Y | 2/2007 |

(Continued)

OTHER PUBLICATIONS

International Search Report and Written Opinion received in International Application No. PCT/US20/23702, dated Jun. 9, 2020, 9 pages.

(Continued)

*Primary Examiner* — Dana Ross
*Assistant Examiner* — Abigail H Rhue
(74) *Attorney, Agent, or Firm* — Perkins Coie LLP

(57) ABSTRACT

Food heaters for heating food such as hot dogs, sausage links, bratwurst, and the like, and associated systems and methods are disclosed herein. In some embodiments, a food heater can include a roller assembly pivotally coupled to a base. The roller assembly can include a drive unit, a plurality of elongate heaters extending outwardly therefrom and generally parallel to one another, and a plurality of rollers removably positioned over corresponding ones of the heaters. The drive unit can include a drive system configured to rotate the rollers to rotate food placed thereon, while the heaters heat the rollers to heat the food. The roller assembly can be rotated away from the base to facilitate removal and cleaning of the rollers.

20 Claims, 14 Drawing Sheets

(56) References Cited

U.S. PATENT DOCUMENTS

| | | |
|---|---|---|
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,898,968 A | 2/1933 | Wyland |
| 1,904,198 A | 4/1933 | Russell |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,575,643 A | 11/1951 | Tamsen |
| 2,584,061 A | 1/1952 | Stilphen |
| 2,586,347 A | 2/1952 | Kloster |
| 2,631,525 A | 3/1953 | Finizie |
| 2,654,823 A | 10/1953 | Altemiller |
| 2,697,395 A | 12/1954 | Steriss |
| 2,812,704 A | 11/1957 | Hawks |
| 2,825,192 A | 3/1958 | Frank |
| 2,856,841 A | 10/1958 | Cretors et al. |
| 2,858,761 A | 11/1958 | Denniss |
| 2,907,264 A | 10/1959 | Bushway |
| 2,918,956 A | 12/1959 | Otto |
| 2,939,379 A | 6/1960 | Schmitt |
| 2,984,169 A | 5/1961 | Bushway |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,167,453 A | 1/1965 | Cretors |
| 3,251,579 A | 5/1966 | Lasar |
| 3,280,720 A | 10/1966 | Kuhn |
| 3,291,304 A | 12/1966 | Fuchs |
| 3,298,303 A | 1/1967 | Waller |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,584,585 A | 6/1971 | Hansel et al. |
| 3,697,289 A | 10/1972 | Day et al. |
| 3,739,953 A | 6/1973 | Cretors |
| 3,783,854 A | 1/1974 | Hurko et al. |
| 3,812,774 A | 5/1974 | Day et al. |
| 3,930,996 A | 1/1976 | Day et al. |
| 4,055,677 A | 10/1977 | White |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,417,505 A | 11/1983 | Pietrobelli |
| 4,438,682 A | 3/1984 | King et al. |
| 4,444,553 A | 4/1984 | Christodoulou |
| 4,494,314 A | 1/1985 | Gell, Jr. |
| 4,512,247 A | 4/1985 | Friedman |
| 4,516,485 A | 5/1985 | Miller |
| 4,522,117 A | 6/1985 | Weimer et al. |
| D285,404 S | 9/1986 | Wang |
| 4,633,772 A | 1/1987 | Bowden et al. |
| 4,648,719 A | 3/1987 | Roben et al. |
| 4,649,263 A | 3/1987 | Goodlaxson |
| 4,658,708 A | 4/1987 | Rastoin |
| 4,702,158 A | 10/1987 | Ishihara |
| 4,704,956 A | 11/1987 | Gill |
| D294,448 S | 3/1988 | Otto |
| 4,763,568 A | 8/1988 | Kiczek |
| 4,763,570 A | 8/1988 | Bellanca |
| 4,828,146 A | 5/1989 | Stein |
| 4,857,031 A * | 8/1989 | Lucas ............... A63H 33/3055 446/481 |
| 4,881,457 A | 11/1989 | Lyga et al. |
| 4,982,657 A | 1/1991 | Ghenic |
| 5,013,575 A | 5/1991 | Stadler et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,117,748 A * | 6/1992 | Costa ................. A47J 37/048 99/441 |
| 5,154,161 A | 10/1992 | Rogers et al. |
| 5,176,069 A | 1/1993 | Chen |
| 5,180,898 A | 1/1993 | Alden et al. |
| 5,203,256 A | 4/1993 | Mueller |
| 5,237,912 A | 8/1993 | Fins |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoebergs |
| 5,332,102 A | 7/1994 | Sennett et al. |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,533,440 A | 7/1996 | Sher |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,611,263 A | 3/1997 | Huang |
| 5,645,878 A | 7/1997 | Breslin et al. |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson et al. |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,857,403 A | 1/1999 | Mann |
| 5,871,792 A | 2/1999 | Weiss et al. |
| 5,890,033 A | 3/1999 | Parker |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,082,248 A | 7/2000 | Turrel |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |
| 6,234,063 B1 | 5/2001 | Evers et al. |
| 6,234,064 B1 | 5/2001 | Turrel |
| 6,331,323 B1 | 12/2001 | Adler-Nissen et al. |
| 6,352,731 B1 | 3/2002 | Weiss |
| 6,374,727 B1 | 4/2002 | Cretors |
| 6,382,087 B1 | 5/2002 | Iiyama |
| 6,393,971 B1 | 5/2002 | Hunot et al. |
| 6,412,395 B1 | 7/2002 | Weiss et al. |
| 6,412,396 B1 | 7/2002 | Wright |
| 6,461,033 B2 | 10/2002 | Palmer et al. |
| 6,534,103 B2 | 3/2003 | Weiss |

(56) References Cited

U.S. PATENT DOCUMENTS

| | | |
|---|---|---|
| 6,575,083 B2 | 6/2003 | Haas et al. |
| 6,578,468 B1 | 6/2003 | Horn |
| 6,612,225 B1 | 9/2003 | Mann |
| 6,619,280 B1 | 9/2003 | Zhou et al. |
| 6,669,304 B2 | 12/2003 | Binning |
| 6,672,201 B2 | 1/2004 | Evans, Sr. et al. |
| 6,800,314 B2 | 10/2004 | Evans et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B1 | 10/2007 | Allington et al. |
| 7,377,209 B2 | 5/2008 | Perttola |
| 7,591,220 B2 | 9/2009 | Sheridan |
| 7,658,143 B2 | 2/2010 | Cretors |
| 7,721,643 B2 | 5/2010 | Berger et al. |
| 7,874,244 B2 | 1/2011 | Rhome |
| 8,011,622 B1 | 9/2011 | Guthrie |
| 8,148,669 B2 | 4/2012 | Schwierking et al. |
| 8,201,492 B2 | 6/2012 | Cretors |
| 8,216,622 B2 | 7/2012 | Evans et al. |
| D672,789 S | 12/2012 | Bongiovanni |
| 8,436,281 B2 | 5/2013 | Cretors |
| 8,464,634 B2 | 6/2013 | Cretors et al. |
| 8,651,014 B2 | 2/2014 | Vidojevic et al. |
| 8,794,129 B2 | 8/2014 | Cretors |
| 8,869,679 B2 | 10/2014 | Ryan et al. |
| 8,887,626 B2 | 11/2014 | Baker, Jr. |
| 8,899,144 B2 | 12/2014 | Snyder |
| 9,144,247 B2 | 9/2015 | Cretors |
| 9,198,532 B2 | 12/2015 | Barrows et al. |
| 9,408,496 B2 | 8/2016 | Cretors |
| D802,982 S | 11/2017 | Vidojevic |
| 10,136,664 B2 | 11/2018 | Ryan et al. |
| 10,299,499 B2 | 5/2019 | Rhome |
| 2001/0045444 A1 | 11/2001 | Muramatsu et al. |
| 2002/0147006 A1 | 10/2002 | Coon et al. |
| 2002/0166454 A1 | 11/2002 | Weiss et al. |
| 2003/0159591 A1 | 8/2003 | Evans et al. |
| 2003/0168438 A1 | 9/2003 | Zhou |
| 2004/0045444 A1 | 3/2004 | Mann |
| 2004/0045542 A1 | 3/2004 | Zhou et al. |
| 2004/0074397 A1 | 4/2004 | Calhoun |
| 2004/0265993 A1 | 12/2004 | Darling et al. |
| 2005/0056154 A1 | 3/2005 | Fu |
| 2005/0061161 A1* | 3/2005 | Hunot .................. A47J 37/048 99/441 |
| 2005/0086814 A1 | 4/2005 | Huang |
| 2006/0149415 A1 | 7/2006 | Richards |
| 2009/0041915 A1 | 2/2009 | Biechteler |
| 2009/0056558 A1 | 3/2009 | Cretors et al. |
| 2009/0126579 A1 | 5/2009 | Cretors et al. |
| 2009/0145242 A1 | 6/2009 | Pryor, Jr. et al. |
| 2009/0208621 A1 | 8/2009 | Dotan |
| 2009/0223378 A1 | 9/2009 | Cretors |
| 2010/0163548 A1 | 7/2010 | Cretors |
| 2010/0170885 A1* | 7/2010 | Cretors .................. H05B 3/02 219/469 |
| 2010/0270282 A1 | 10/2010 | Fernandez et al. |
| 2011/0014340 A1 | 1/2011 | Spitzley et al. |
| 2011/0027434 A1 | 2/2011 | Cretors et al. |
| 2011/0076372 A1 | 3/2011 | Cretors |
| 2011/0076373 A1 | 3/2011 | Cretors et al. |
| 2011/0120317 A1 | 5/2011 | Rhome |
| 2011/0185914 A1 | 8/2011 | Snyder |
| 2011/0274804 A1 | 11/2011 | Barrows et al. |
| 2012/0266756 A1 | 10/2012 | Cretors |
| 2013/0022727 A1 | 1/2013 | Sherwin |
| 2013/0104747 A1* | 5/2013 | Davis .................. A47J 37/048 99/441 |
| 2013/0276640 A1 | 10/2013 | Cretors |
| 2013/0276641 A1 | 10/2013 | Vidojevic |
| 2013/0280386 A1 | 10/2013 | Cretors |
| 2013/0298781 A1 | 11/2013 | Ganuza et al. |
| 2014/0093636 A1 | 4/2014 | Fitzgerald et al. |
| 2014/0311356 A1 | 10/2014 | Daniels |
| 2015/0064320 A1 | 3/2015 | Cretors |
| 2017/0156545 A1* | 6/2017 | Davis .................. A47J 37/048 |
| 2017/0290360 A1 | 10/2017 | Vidojevic |
| 2018/0020864 A1 | 1/2018 | Cretors et al. |
| 2019/0191927 A1* | 6/2019 | Diffely .................. A47J 37/048 |
| 2019/0364938 A1 | 12/2019 | Vidojevic |

FOREIGN PATENT DOCUMENTS

| | | |
|---|---|---|
| CN | 201701013 U | 1/2011 |
| CN | 203424825 U | 2/2014 |
| CN | 203737561 | 7/2014 |
| DE | 8624682 | 12/1986 |
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | 9215183 A1 | 9/1992 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

Cretors Coater Mixer Tumbler, http://www.cretors.com/store/catalog.asp?item=39&category_id=3, Copyright 2014, 1 page.
C. Cretors and Co., "Diplomat" product manual for models DI20C, DI32C, DI20F, DI32F, DI205, TDI205, TDI206, DI325 and TDI326; 1996, 58 pages.
C. Cretors and Co., "Diplomat" product manual for models DI20CP, DI32CP, DI20FP and DI32FP; 1989, 62 pages.
C. Cretors and Co.; Multi-product sell sheet for "The New Diplomat Counter Showcase" and "Thunder Kettle" for models G48E, EPR48E5 and PR48E5; dated 1990, 2 pages.
Loeb Equipment 20 Gallon Groen Model DNTA20 Twin Scrape Agitated Jacketed Kettle; www.loebequipment.com, Oct. 31, 2011, 1 page.
Suspended Poppers: 20 oz., 32 oz., 48 oz., 60 oz., C. Cretors and Company, published Nov. 2004, 6 pages.
Topping & Dispensing Systems, C. Cretors and Company Product Brochure, pp. 36-39, published Oct. 2005, 5 pages.
"Induceramic, infrared honeycomb ceramic burner plate, using Wayback Machine," retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014), 4 pages.
Platvoet et al., "Process Burner 101," American Institute of Chemical Engineers; Retrieved on Aug. 19, 2019 from https://www.aiche.org/sites/default/files/cep/20130835.pdf Copyright 2013 (Year: 2013), 5 pages.
Topping Systems, C. Cretors and Company, published Nov. 2003, 2 pages.
"How to Succeed in the Caramel Corn Business," Gold Medal Products Company, Copyright 2011, gmpopcorn.com, 24 pages.
European Search Report dated Jan. 24, 2013; European Application No. 05846817.4; Applicant: C. Cretors and Company (5 pages).
Gold Medal Products Co.; "Funfood Equipment & Supplies" catalog; vol. 56, dated 2000, 108 pages.
International Search Report and Written Opinion for PCT/US05/42059; Applicant: C. Cretors and Company; dated Nov. 22, 2006, 8 pages.
Non-Final Office Action; U.S. Appl. No. 12/640,314; dated May 2, 2012; 8 pages.
Proctor Companies: "Concession Stands and Equipment" catalog, vol. 3, 1996, 84 pages.
Proctor Companies; Equipment Catalog, 1992, 33 pages.

\* cited by examiner

FOOD HEATERS, SUCH AS FOR USE IN HEATING HOT DOGS

CROSS-REFERENCE TO RELATED APPLICATION(S)

This application claims the benefit of U.S. Provisional Patent Application No. 62/815,614, filed Mar. 8, 2019, and titled "FOOD HEATERS, SUCH AS FOR USE IN HEATING HOT DOGS," which is incorporated herein by reference in its entirety.

TECHNICAL FIELD

The present disclosure is generally directed to devices for rotating and heating food such as hot dogs, sausages, bratwurst and the like.

BACKGROUND

Conventional devices for heating hot dogs typically include tubular rollers that support the hot dogs. Such devices also include electric heating elements positioned inside the rollers for heating the hot dogs, and a drive system for rotating the rollers and turning the hot dogs. The hot dogs supported on the rollers are rotated and heated due to contact with the rollers. As the hot dogs are heated, the rollers can be become covered with juices that naturally cook out of the hot dogs. One downside of conventional hot dog heating devices, however, is that they can be difficult and time consuming to clean (e.g., to remove the juices from the rollers). For example, many conventional hot dog heating devices require that the device be disassembled for cleaning, and a large amount of space may be required to facilitate the disassembly. Many hot dog heating devices, however, are positioned on crowded counters (e.g., in a convenience store, concession stand, etc.) where space is limited for disassembly.

DETAILED DESCRIPTION

Figure 1A:
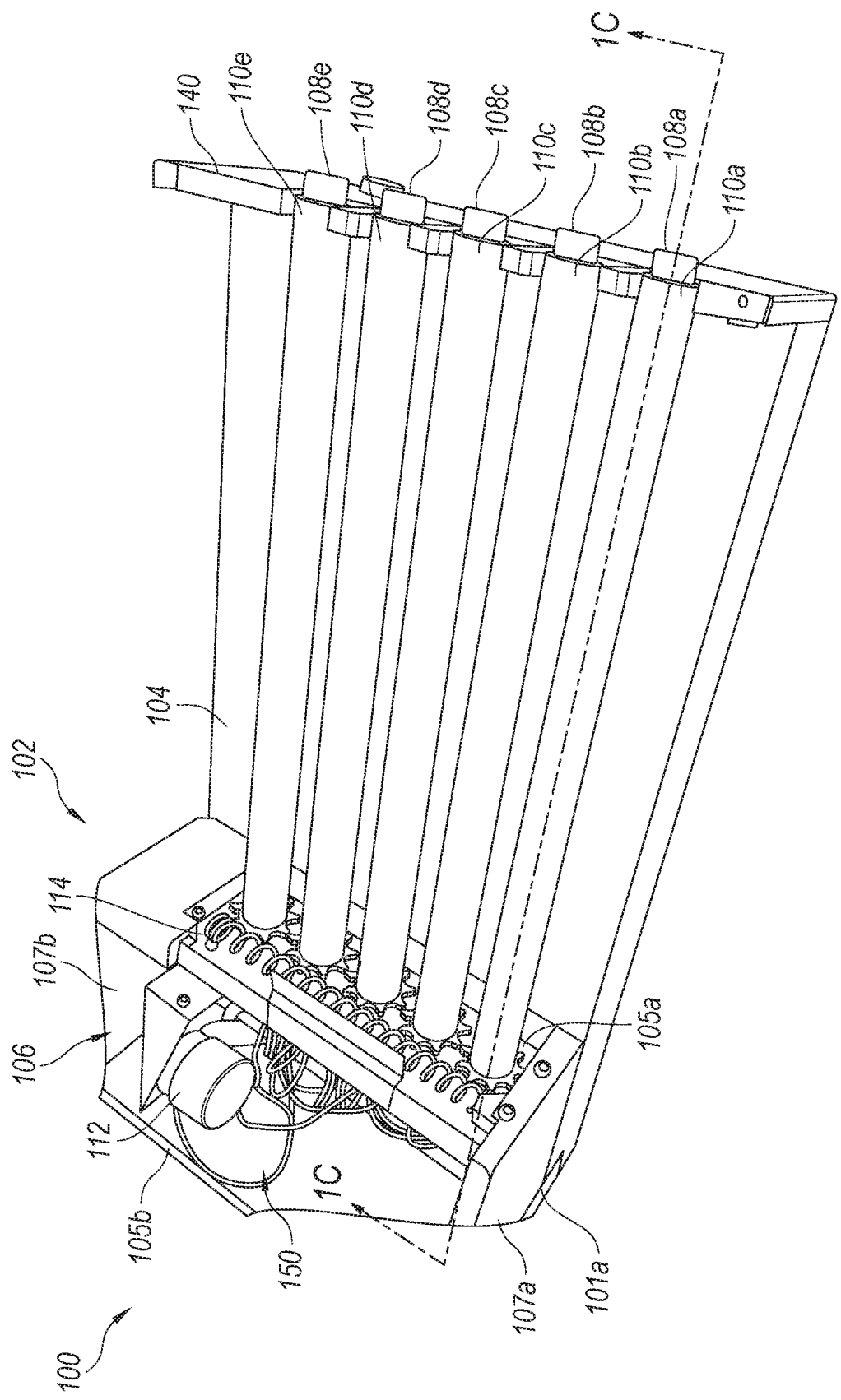
FIGS. 1A and 1B are top perspective views of a food heater in a first position and a second position, respectively, configured in accordance with embodiments of the present technology.

The following disclosure describes various embodiments of systems and methods for heating food such as hot dogs, sausage links, bratwurst, other forms of encased meat, or any kind of food that can be prepared by rotation or other movement with a heated roller. In some embodiments, a food heating apparatus can include a roller assembly pivotally coupled to a base. The roller assembly can include a drive unit and a plurality of elongate heaters fixedly attached to the drive unit and extending outwardly from the drive unit generally parallel to one another. A plurality of rollers can be removably positioned on (e.g., slid onto) corresponding ones of the heaters. The drive unit can include a drive system configured to rotate the rollers with respect to the base to rotate food placed on the rollers, while the heaters heat the rollers to heat the food.

In one aspect of the present technology, the roller assembly is pivotable from (a) a first position in which the rollers are oriented generally parallel to the base to (b) a second position in which the rollers are oriented at an angle to the base. The food heating device can operate to rotate and heat food when the roller assembly is in the first position. In the second position, the rollers can be removed from the roller assembly (e.g., slid off the heaters) to facilitate cleaning of the rollers and/or other components of the food heating device.

Certain details are set forth in the following description and in FIGS. 1-8B to provide a thorough understanding of various embodiments of the present technology. In other instances, well-known structures, materials, operations, and/or systems often associated with heating or cooking food are not shown or described in detail to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
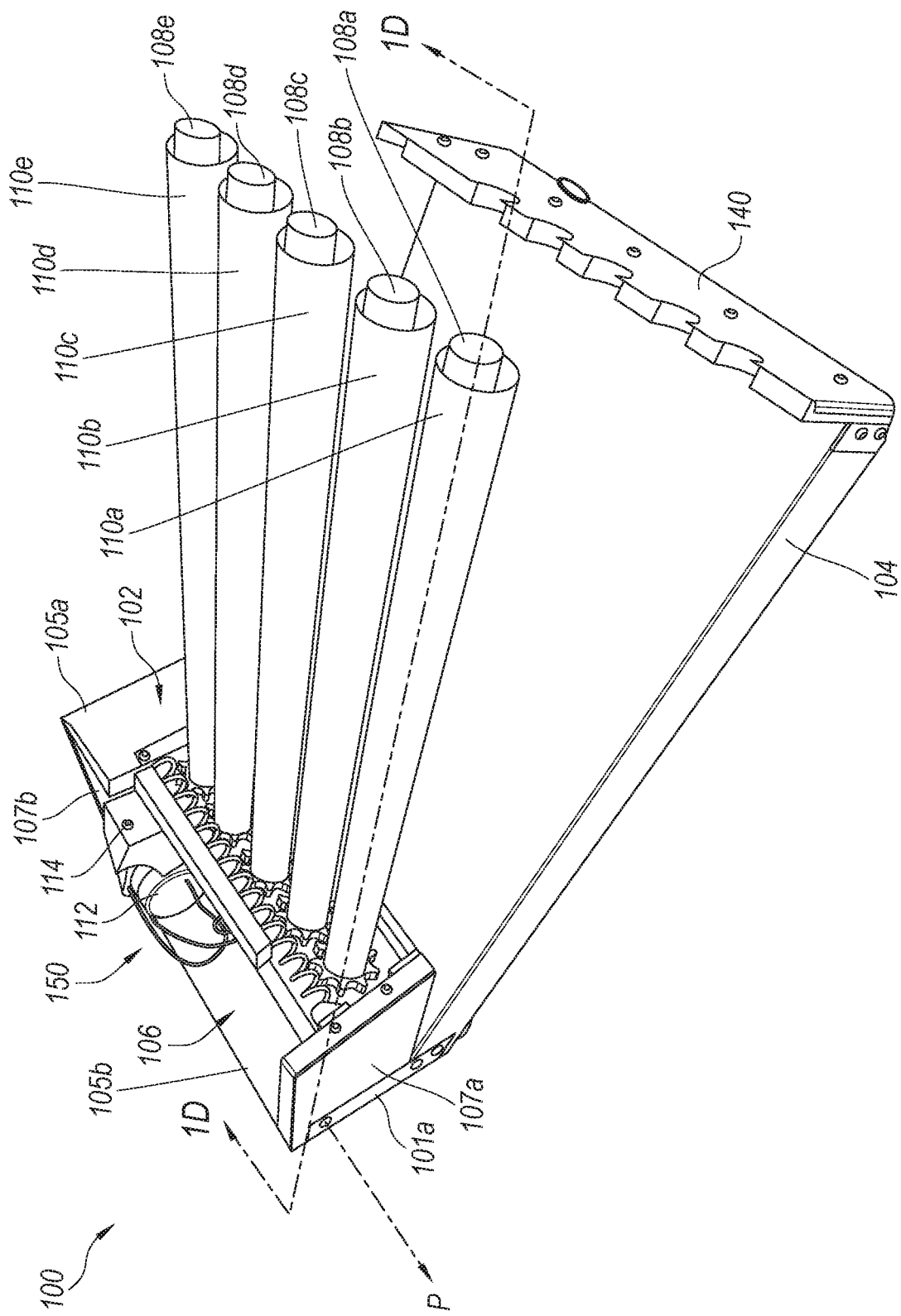

FIGS. 1A and 1B are perspective top views of a food heater 100 having a roller assembly 102 in a first position (e.g., a heating and/or cooking position) and a second position (e.g., a roller removal and/or cleaning position), respectively, configured in accordance with embodiments of the present technology. Referring to FIGS. 1A and 1B together, the roller assembly 102 is pivotally coupled to a base 104. The roller assembly 102 includes a drive unit 106 (illustrated with a top wall removed in FIGS. 1A and 1B) and a plurality of elongate heaters 108 (identified individually as first through fifth heaters 108a-108e, respectively) extending outward away from a front wall 105a (opposite a rear wall 105b) of the drive unit 106 and arranged generally parallel to one another. A plurality of elongate rollers 110 (identified individually as first through fifth rollers 110a-110e, respectively) are installed on corresponding ones of the heaters 108 and configured to support one or more food products (e.g., one or more hot dogs, bratwurst, etc.) between adjacent pairs thereof. In the illustrated embodiment, there are five heaters 108 and five corresponding rollers 110. However, in other embodiments the food heater 100 can include any number of heaters 108 and rollers 110 greater than two.

The drive unit 106 can house a drive system 150 having a motor 112 (e.g., an electric motor) that is operably coupled to and configured to rotate an elongate drive member 114. In the illustrated embodiment, the drive member 114 is a wire or rod having a helical/spiral shape. As described in greater detail below, the drive member 114 is configured to rotate the rollers 110 about their longitudinal axes to rotate the food product(s) placed thereon. In the illustrated embodiment, the drive unit 106 further includes a pair of opposing sidewalls 107 (identified individually as a first sidewall 107a and a second sidewall 107b) that are coupled to the base 104 via hinge brackets 101 (identified individually as a first hinge bracket 101a and a second hinge bracket 101b; the second hinge bracket 101b is obscured in FIGS. 1A and 1B). More particularly, the sidewalls 107 are attached to the hinge brackets 101 at two pivot points that defines a pivot axis P about which the roller assembly 102 can pivot between the first and second positions. In one aspect of the present technology, the entire roller assembly 102 can be easily removed from the base 104 (e.g., for cleaning or maintenance) simply by disconnecting the sidewalls 107 from the hinge brackets 101.

As described in greater detail below, in the first position (FIG. 1A), end portions of the heaters 108 and rollers 110 are supported on a support structure 140 that is mounted to the base 104 such that the heaters 108 and the rollers 110 extend generally parallel to the upper surface of the base 104. In the second position (FIG. 1B), the drive unit 106 is rotated upwardly such that the heaters 108 and the rollers 110 are rotated away from the support structure 140 and extend upwardly at an angle relative to the base 104.

Figure 1C:
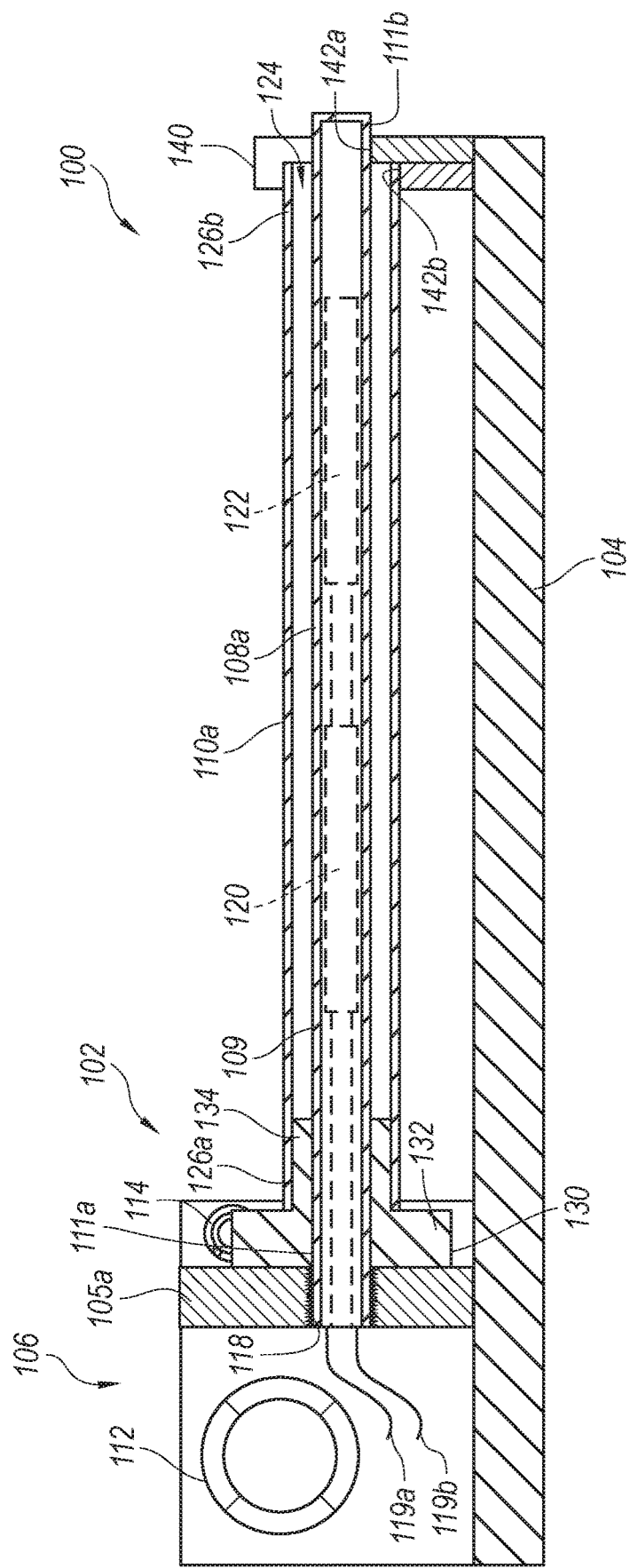
FIGS. 1C and 1D are partially schematic, cross-sectional side views of the food heater taken along the lines 1C-1C in FIGS. 1A and 1D-1D in FIG. 1B, respectively.
Figure 1D:
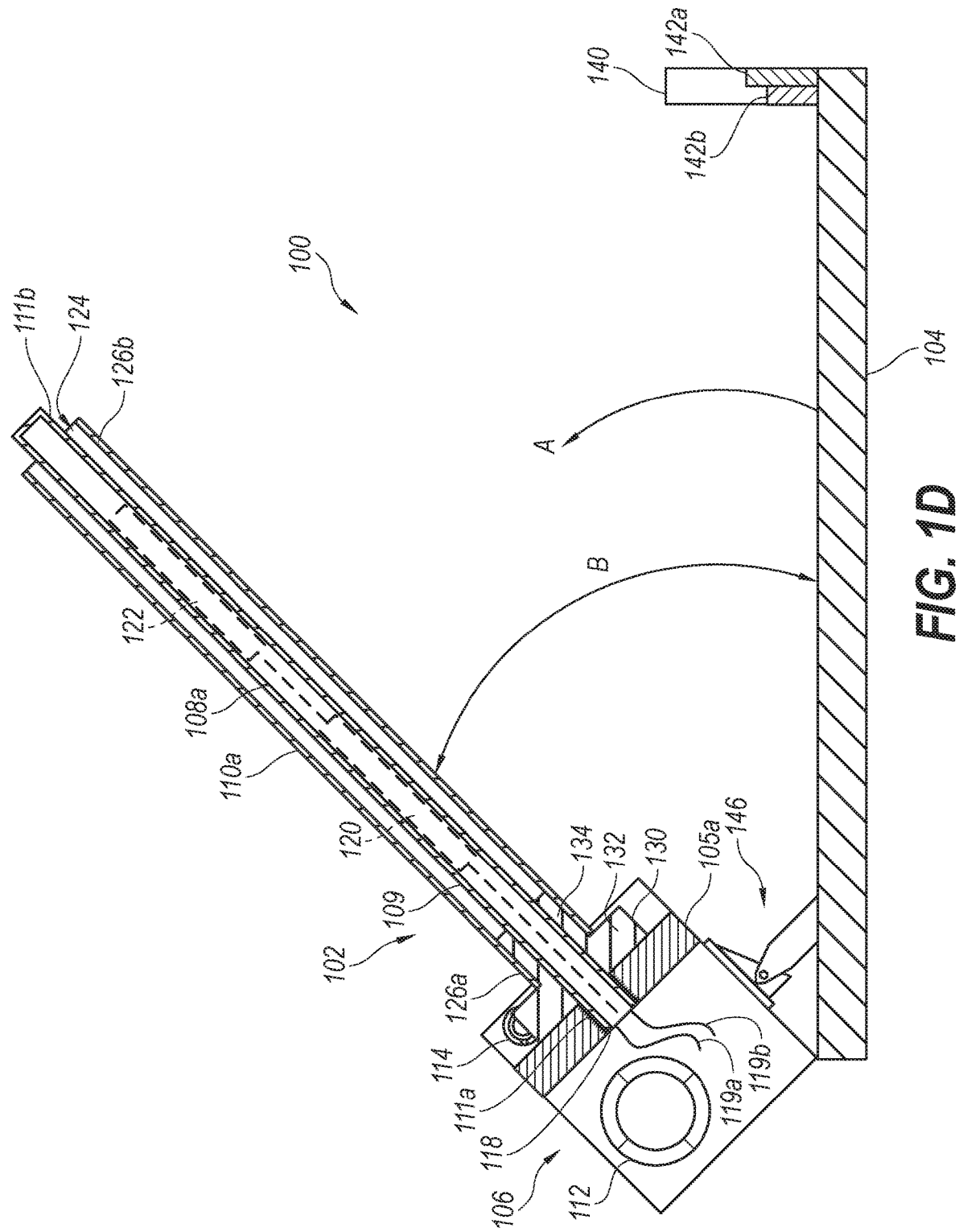

FIGS. 1C and 1D are partially schematic, cross-sectional side views of the food heater 100 taken along the line 1C-1C in FIG. 1A and the line 1D-1D in FIG. 1B, respectively. In general, the features and configurations of the heaters 108 and rollers 110 can be generally similar or identical. Accordingly, while the details of the first heater 108a and the first roller 110a are described in detail with reference to FIGS. 1C and 1D, it will be understood that the second through fifth heaters 108b-108e and the second through fifth rollers 110b-110e can have the same or similar features, respectively.

Referring first to FIG. 1C, the first heater 108a includes a tube 109 (e.g., a metal tube) having a first end portion 111a coupled to the front wall 105a of the drive unit 106 and a second end portion 111b configured to be positioned on the support structure 140. More specifically, in the first position shown in FIG. 1C, the second end portion 111b is positioned on a first surface 142a of the support structure 140. The first end portion 111a can be releasably or permanently secured within an aperture 118 in the front wall 105a of the drive unit 106. For example, in the illustrated embodiment the first end portion 111a has a male thread (e.g., a male NPT thread) while the corresponding aperture 118 in the front wall 105a has a corresponding female thread (e.g., a female NPT thread) such that the first heater 108a can be screwed into/out of the aperture 118. In other embodiments, the first heater 108a can be secured to the front wall 105a in other suitable manners such as, for example, via a welded connection, one or more fasteners (e.g., bolts), a press fit, one or more adhesives, etc.

In some embodiments, the first heater 108a can be a cartridge heater having a first electrical lead 119a and a second electrical lead 119b that are electrically coupled to a heating element 120 (shown schematically) and, optionally, to a thermocouple 122 (shown schematically) disposed within the tube 109. In certain embodiments, the first heater 108a can be a cartridge heater manufactured by TEMPCO Electrical Heater Corporation, of Wood Dale, Illinois. The electrical leads 119a, b can be electrically connected to an external power source (not shown; e.g., a standard AC power socket) to power the heating element 120. The heating element 120 is configured to heat the first roller 110a and any food product placed thereon As described in greater detail below with reference to FIGS. 5A and 5B, in some embodiments the thermocouple 122 can be electrically coupled to a controller configured to receive temperature information from the thermocouple 122 and to control power to the heating element 120—and thus the temperature of the first roller 110a—based on the temperature information.

In the illustrated embodiment, the first roller 110a includes a first end portion 126a (e.g., a proximal end portion) and a second end portion 126b (e.g., a distal end portion) that are open to an interior space 124 extending through the first roller 110a. The second end portion 126b of the first roller 110a is configured to be supported on a second surface 142b (e.g., a bearing surface) of the support structure 140 when the roller assembly 102 is in the first position shown in FIG. 1C, and the second end portion 111b of the first heater 108a can project beyond the second end portion 126b of the first roller 110a.

Figure 8A:
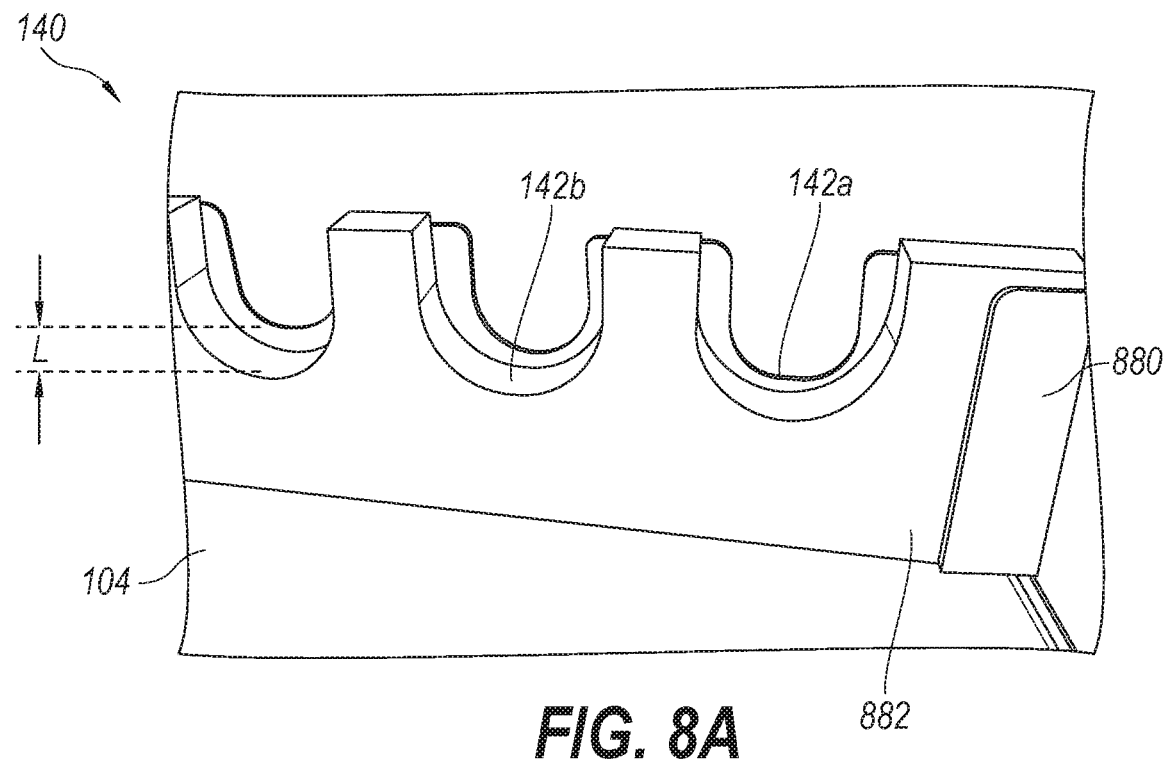
FIGS. 8A and 8B are enlarged perspective rear views of a support structure of the food heater configured in accordance with embodiments of the present technology.
Figure 8B:
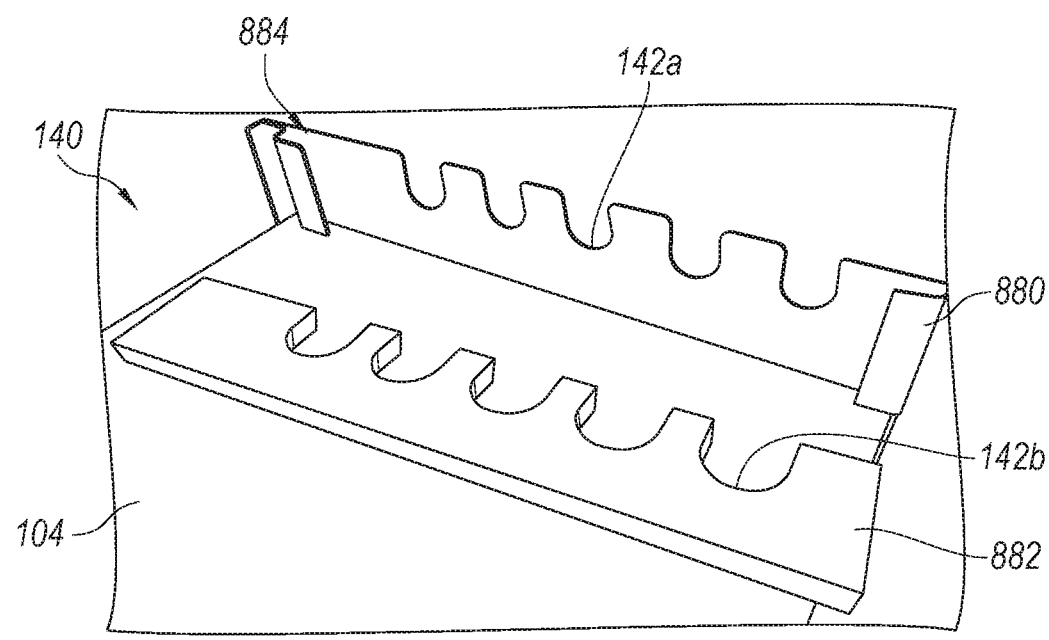

In one aspect of the present technology, the support structure 140 is configured to concentrically support the second end portion 111b of the first heater 108a and the second end portion 126b of the first roller 110a such that these components remain generally coaxially aligned when the roller assembly 102 is in the first position—even when multiple food products are placed in contact with the first roller 110a. More specifically, FIGS. 8A and 8B are enlarged perspective rear views of the support structure 140 configured in accordance with embodiments of the present technology. Referring to FIGS. 1C, 8A, and 8B together, the support structure 140 can include a first portion 880 defining the first surface 142*a* and mounted to the base 104 (e.g., via one or more fasteners, a welded connection, etc.), and a second portion 882 defining the second surface 142*b* and that can be removably coupled to the first portion 880. For example, the second portion 882 can be secured adjacent to the first portion 880 within a slot 884. The circular surfaces 142*a, b* of the support structure 140 can be spaced apart by a radial distance L that is generally the same as the radial distance between the outer surface of the first roller 110*a* and the outer surface of the tube 109 of the first heater 108*a* when these components are coaxially arranged. In some embodiments, the surfaces 142*a, b* of the support structure 140 can comprise different materials. For example, the second surface 142*b* can comprise a low-friction plastic to, for example, facilitate smooth rotation of the first roller 110*a* during operation, while the first surface 142*a* can comprise a metal. Moreover, as shown in FIG. 8B, the second portion 882 of the support structure 140 (which contacts the rollers 110) can be easily removed for cleaning.

Figure 2A:
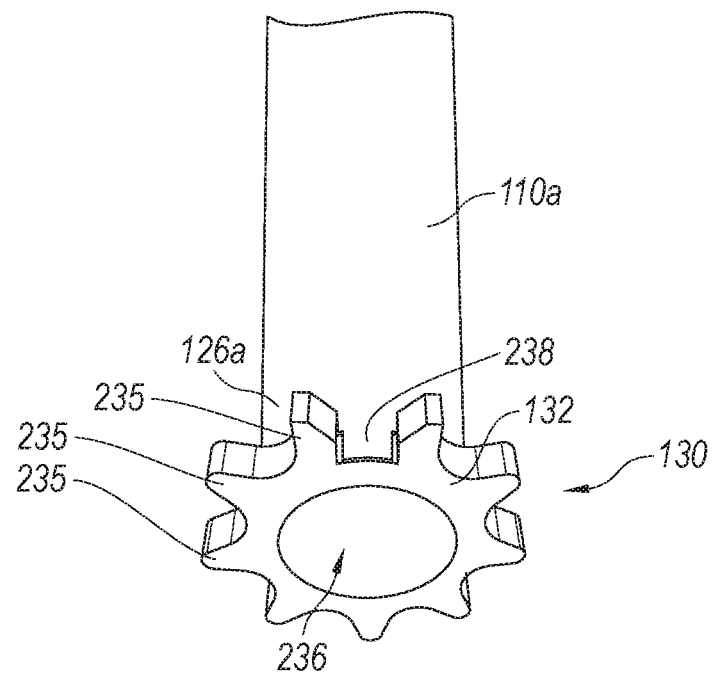
FIGS. 2A and 2B are perspective end views of a roller of the food heater of FIGS. 1A-1D configured in accordance with embodiments of the present technology.
Figure 2B:
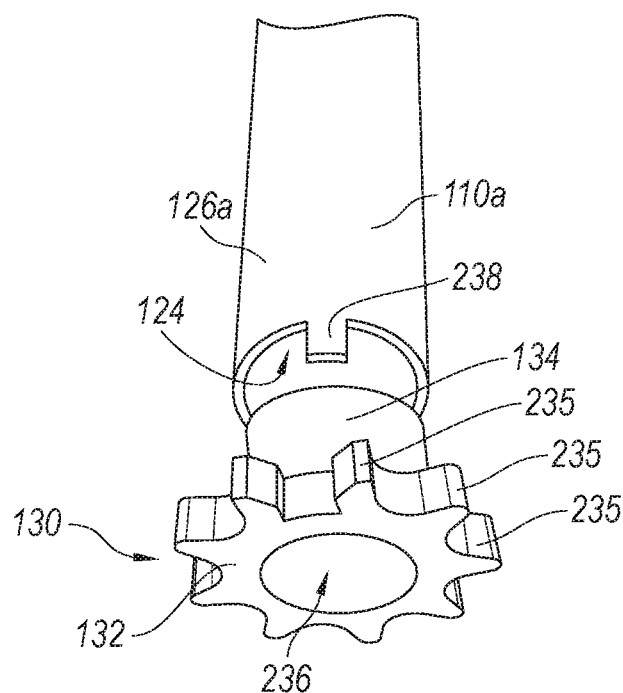

In the illustrated embodiment, the first end portion 126*a* of the first roller 110*a* is coupled to a sprocket 130 that is rotatably supported on the first heater 108*a* and engages the drive member 114. In some embodiments, the first roller 110*a* can be releasably secured to the sprocket 130. More specifically, FIGS. 2A and 2B are perspective end views of the first roller 110*a* with the sprocket 130 secured to and removed from the first roller 110*a*, respectively, in accordance with embodiments of the present technology. Referring to FIGS. 1B-2B together, the sprocket 130 includes a sprocket portion 132, an insert portion 134, and a bore or through-hole 236 extending through the center of the sprocket 130. The insert portion 134 is configured to be inserted into the interior space 124 of the first roller 110*a* (e.g., into the annular space between the tube 109 of the first heater 108*a* and the first roller 110*a*) and, in some embodiments, can be secured within the interior space 124 via a press-on friction fit. The sprocket portion 132 includes a plurality of teeth 235 projecting radially outward. As described in greater detail below with reference to FIG. 6, the drive member 114 is configured to engage the teeth 235 to rotate the first roller 110*a* about first heater 108*a*. In the embodiment illustrated in FIGS. 2A and 2B, the first roller 110*a* further includes a tab or projection 238 configured to project between an adjacent pair of the teeth 235 to secure the sprocket 130 to the first end portion 126*a* of the first roller 110*a*. The tab 238 can prevent the sprocket 130 from rotating relative to the first roller 110*a* when the drive member 114 engages the sprocket 130. Although one tab 238 is illustrated in FIGS. 2A and 2B, in other embodiments, the first roller 110*a* can include two or more tabs (e.g., four tabs) that engage the teeth 235 to secure the sprocket 130 to the first roller 110*a*.

In one aspect of the present technology, the tab 238 enables the sprocket 130 to be releasably secured to the first roller 110*a* without the use of any fasteners or permanent connections (connections formed via, e.g., welding or bonding the sprocket 130 to the first roller 110*a*). Thus, the sprocket 130 can be easily removed from the first roller 110*a* to facilitate cleaning of (e.g., the removal of cooked-out juices from) the sprocket 130 and the first roller 110*a*.

The sprocket 130 slidably extends around the first heater 108*a* to rotatably support the first roller 110*a* on the first heater 108*a*. In some embodiments, the diameter of the bore 236 can be selected to generally match but be slightly larger (e.g., about 0.001 inch larger) than the outer diameter of the tube 109. In some embodiments, the fit between the sprocket 130 and the first roller 110*a* can be tight enough such that the first roller 110*a* (e.g., the second end portion 126*b* of the first roller 110*a*) does not contact the first heater 108*a* (e.g., the second end portion 111*b* of the tube 109) when the food heater 100 is in the second position (FIG. 1D). Put differently, the fit of the sprocket 130 over the first heater 108*a* can be tight enough to maintain the first heater 108*a* and the first roller 110*a* generally coaxially aligned even though the first heater 108*a* and the first roller 110*a* are cantilevered from the front wall 105*a* of the drive unit 106 and not supported by the support structure 140 in the second position. In other embodiments, the fit between the sprocket 130 and the first roller 110*a* can be loose enough such that the first roller 110*a* contacts (e.g., rests on) the first heater element 108*a* when the food heater 100 is in the second position. Such a fit can allow the first roller 110*a* to adjust for any misalignment (e.g., arising from the connection between the sprocket 130 and the first roller 110*a*, the fit of the sprocket 130 on the first heater 108*a*, etc.) during rotation. The sprocket 130 can be formed of a material selected not to melt or otherwise deform at the operating temperature of the first heater 108*a*. For example, the sprocket 130 can be formed of Nylon, Teflon, or another high temperature plastic.

Figure 3:
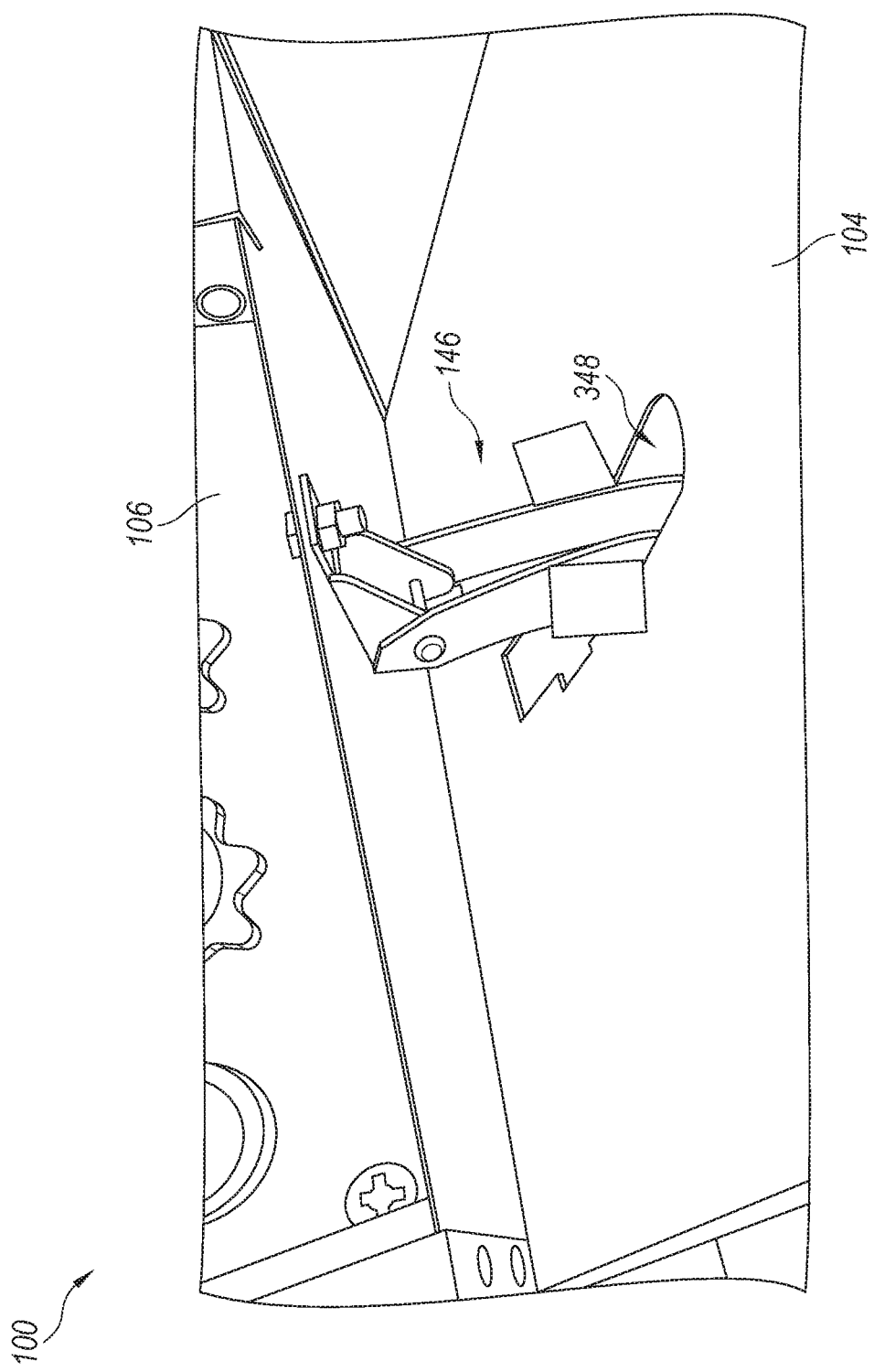
FIG. 3 is an enlarged perspective front view of a food heater stand configured in accordance with embodiments of the present technology.

Referring to FIGS. 1A-1D together, to move the roller assembly 102 from the first position to the second position shown in FIG. 1D, an operator can grasp one or more of the heaters 108, rollers 110, and/or other components of the roller assembly 102 and rotate the roller assembly 102 upwardly about the pivot axis P (e.g., in a direction A shown in FIG. 1D). In the first position, the heaters 108 and the rollers 110 extend generally parallel to the base 104 while, in the second position, the rollers 110 are oriented at an angle B (FIG. 1D) relative to the base 104. In a particular embodiment, the angle B can be about 45 degrees. In some embodiments, as shown in FIG. 1D, the food heater 100 can include a stand 146 configured to operably support roller assembly 102 when it is rotated to the second position. More specifically, FIG. 3 is an enlarged perspective front view of the stand 146 shown in FIG. 1D configured in accordance with embodiments of the present technology. Referring to FIGS. 1D and 3 together, the stand 146 can be configured to lock the roller assembly 102 in the second position without requiring the operator to manually hold the roller assembly 102 in that position. In some embodiments, the stand 146 is configured to fold and/or retract into a recess 348 in the base 104 when the roller assembly 102 is moved from the second position to the first position. In other embodiments, the base 104 and/or the drive unit 106 can include a motor or spring operably coupled to the stand 146 and configured to automatically move the roller assembly 102 between the first and second positions.

Figure 4:
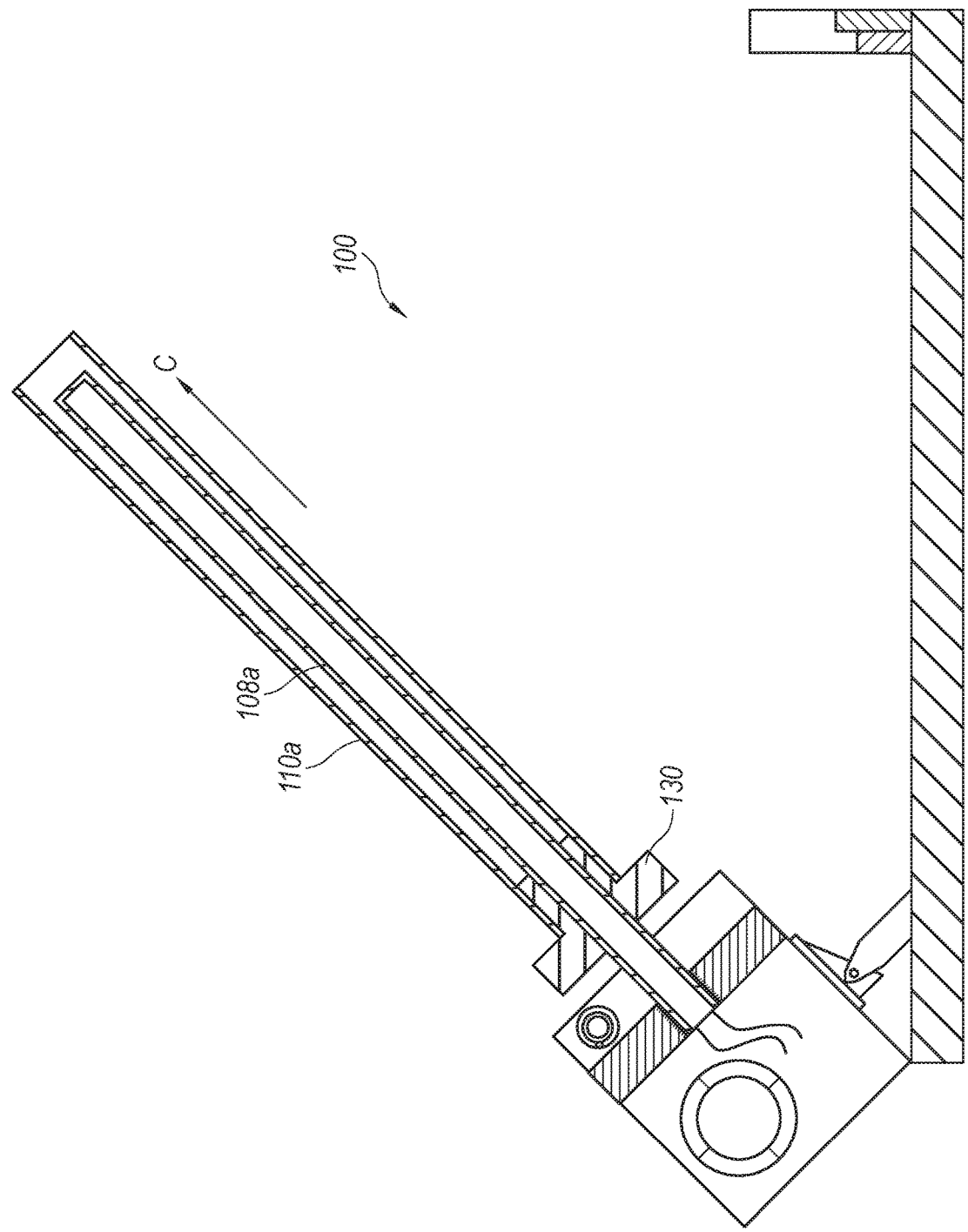
FIG. 4 is a cross-sectional side view of the food heater taken along the line 1D-1D in FIG. 1B illustrating removal of a roller from the food heater in accordance with embodiments of the present technology.

In one aspect of the present technology, when the roller assembly 102 is in the second position, the first roller 110*a* and sprocket 130 can be removed from the first heater 108*a* merely by sliding the first roller 110*a* and sprocket 130 off the first heater 108*a*. For example, FIG. 4 is a cross-sectional side view of the food heater 100 taken along the line 1D-1D in FIG. 1B during removal of the first roller 110*a* from first heater 108*a* in accordance with embodiments of the present technology. In the illustrated embodiment, the first roller 110*a* is removed from the first heater 108*a* by moving (e.g., sliding) the first roller 110*a* and the sprocket 130 in a direction C that is generally parallel to the first heater 108*a*. In this manner, the first roller 110*a* and the sprocket 130 can be fully and easily removed from the first heater 108a to facilitate cleaning and/or replacement of these components. In another aspect of the technology, the drive system 150 can be operated to rotate the rollers 110 when the roller assembly 102 is in the second position, and the operator can hold a towel or other cleaning instrument against the rollers 110 to clean the rollers 110 as they rotate. Moreover, rotating the roller assembly 110 to the second position provides easy access to the upper surface of the base 104 to facilitate cleaning thereof.

Referring to FIGS. 1A-1D and 4 together, in another aspect of the present technology the rollers 110 can be removed from the roller assembly 102 without requiring any additional disassembly of the food heater 100. For example, the support structure 140 does not need to be removed from the base 104 or otherwise dissembled to remove the rollers 110 because the rollers 110 are angled away from the base 104 and the support structure 140 in the second position. This arrangement can be advantageous when the food heater 100 is positioned on a counter of, for example, a convenience store, concession stand, etc. In such environments, various machines may be placed close together on the counter with little lateral separation to maximize the use of counter space. This can make it difficult and time-consuming to clean, service, and/or repair conventional food heaters having rollers that require the disassembly of the food heater and/or a lot of space to permit the rollers to be removed for cleaning. For example, adjacent machines must often be moved to allow access to the rollers and/or heating elements. In contrast, the present technology allows the roller assembly 102 to be pivoted upward and the rollers 110 removed for cleaning even when the food heater 100 is positioned close to other machines on a counter or otherwise positioned in an environment without a large amount of open space around the food heater 100.

Figure 5A:
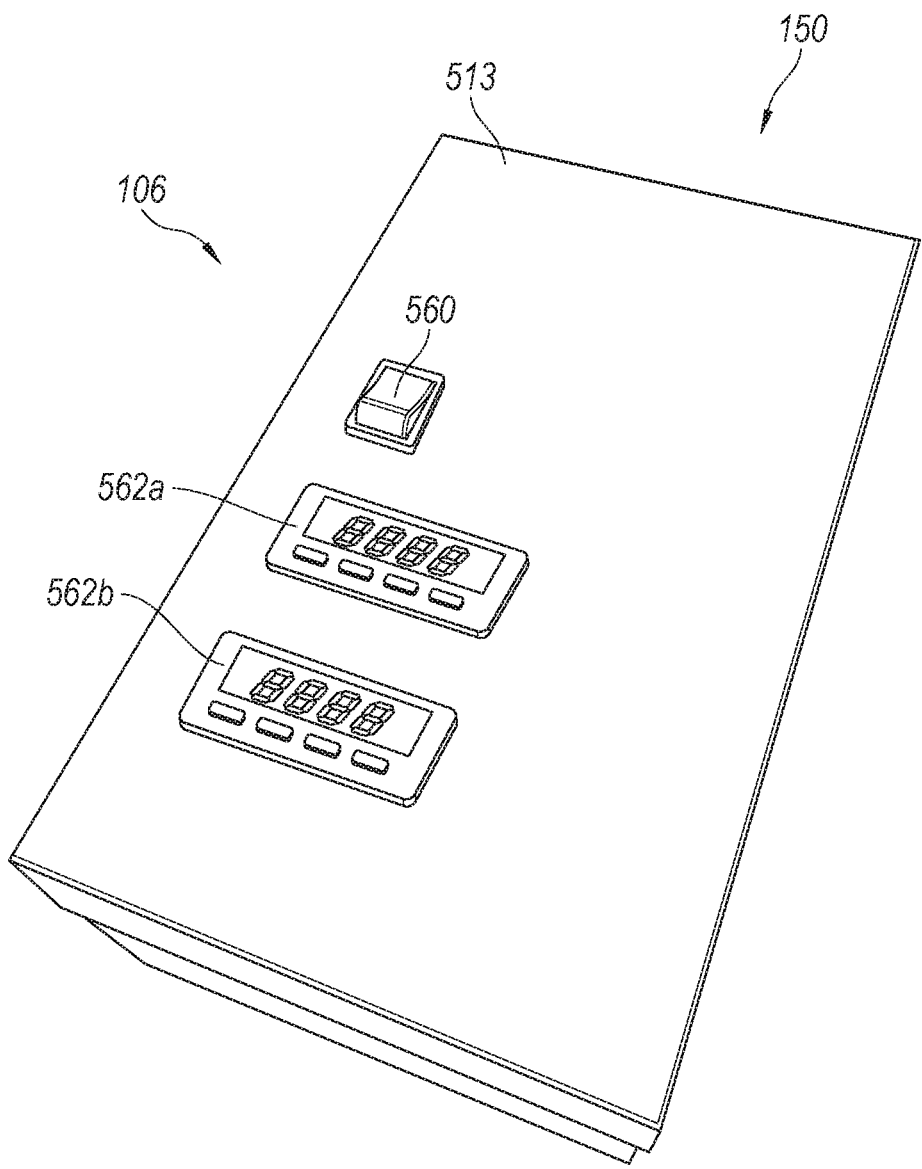
FIGS. 5A and 5B are perspective top views of a drive unit of the food heater configured in accordance with embodiments of the present technology.
Figure 5B:
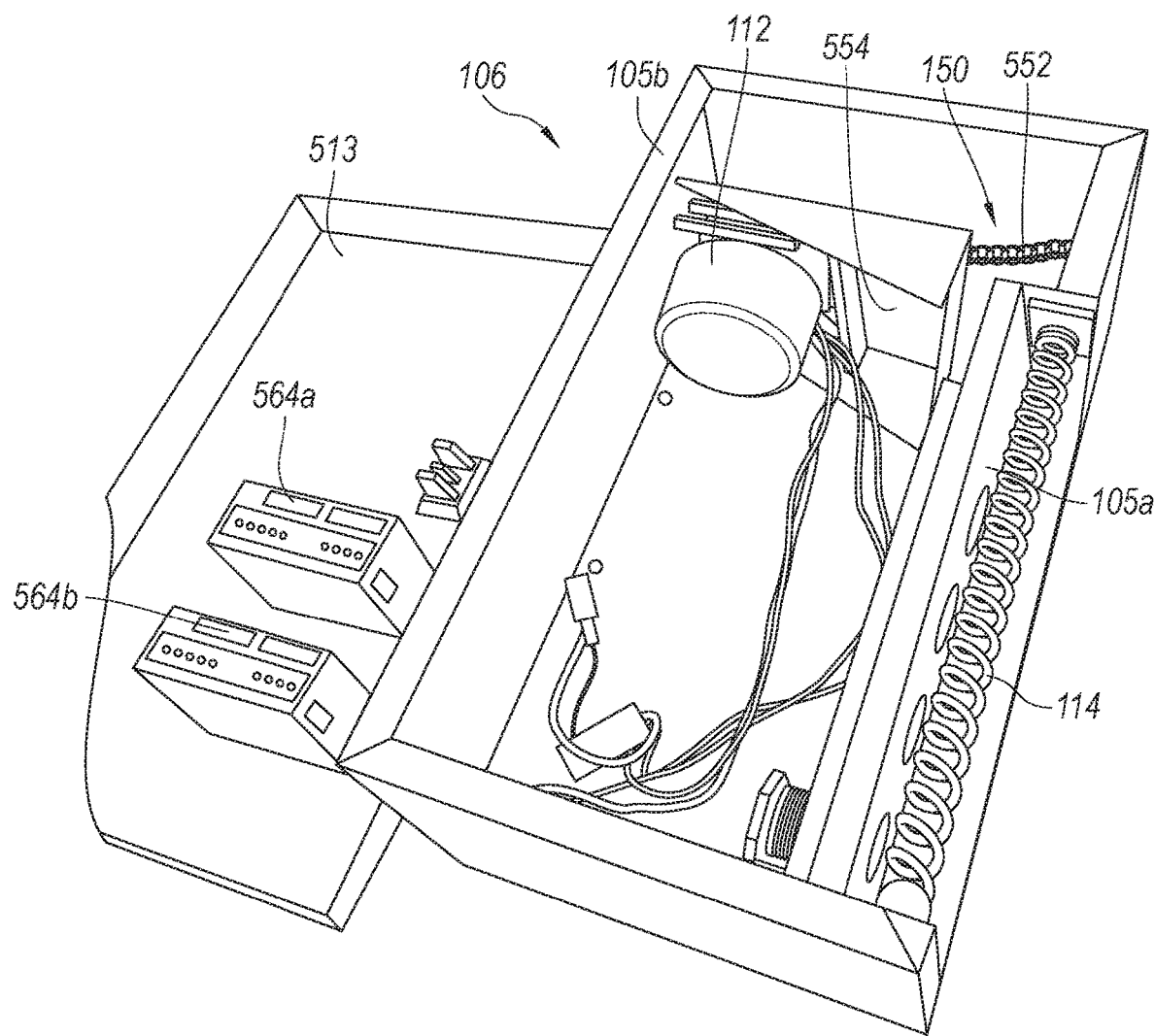
Figure 5C:
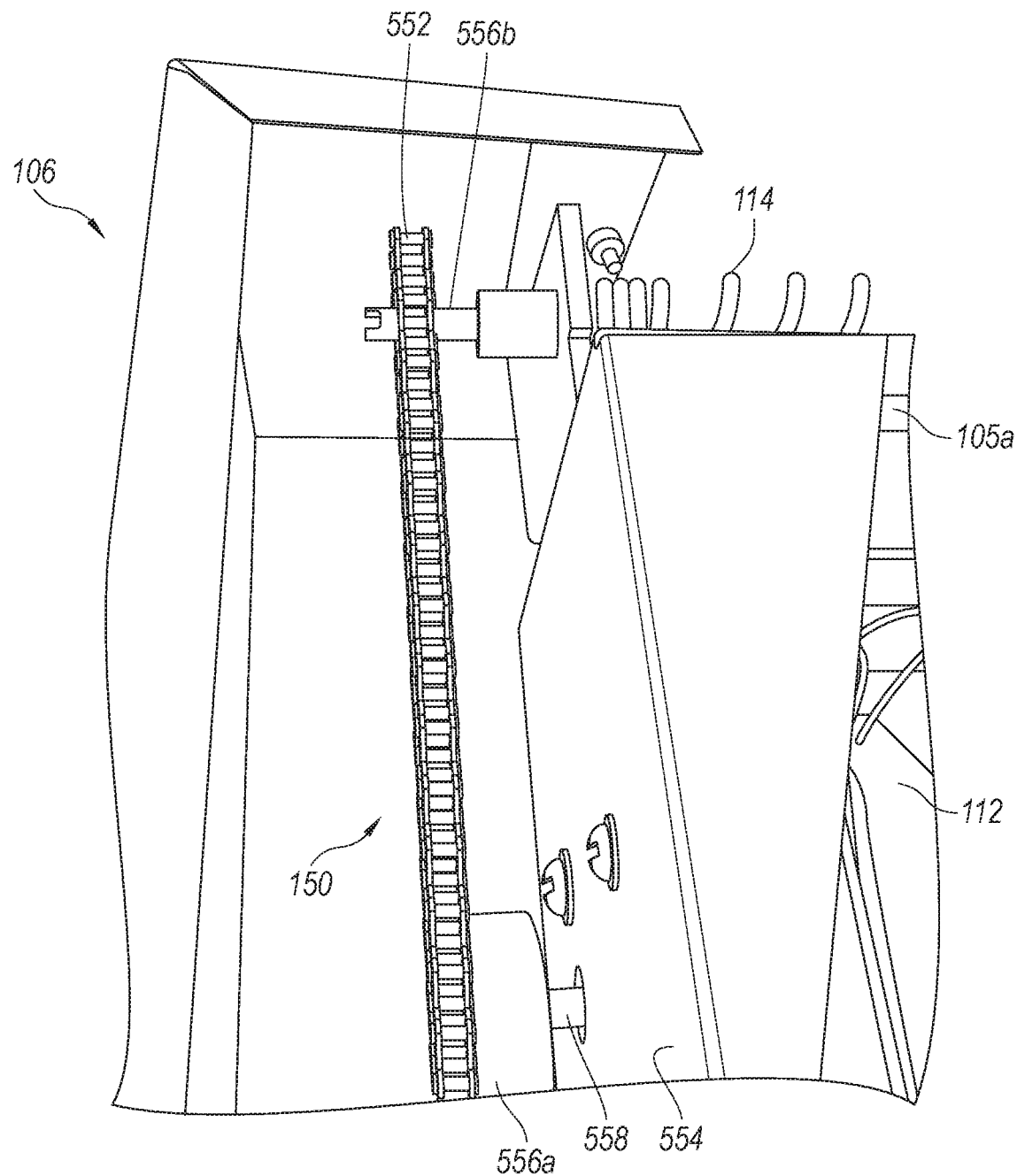
FIG. 5C is an enlarged perspective top view of a portion of the drive unit.

FIGS. 5A-5C illustrate various features of the drive system 150 and the drive unit 106 configured in accordance with embodiments of the present technology. For example, FIG. 5A is a perspective top view of the drive unit 106, FIG. 5B is a perspective top view of the drive unit 106 with a top panel 513 removed, and FIG. 5C is an enlarged perspective top view of the drive unit 106 with the top panel 513 removed. Referring to FIGS. 5A-5C together, the drive system 150 includes the motor 112, the drive member 114, and a drive chain 552 operably coupling the motor 112 (e.g., a motor sprocket) to the drive member 114. In the illustrated embodiment, the motor 112 is mounted to a partition 554 extending between the front and rear walls 105a, b of the drive unit 106. The motor 112 can be an electric motor and is operably coupled to a first sprocket 556a via a drive shaft 558 that extends through the partition 554. The chain 552 is looped around and operably coupled to the first sprocket 556a, and a second sprocket 556b that is operably coupled to an end portion of the drive member 114. During operation, the motor 112 is configured to rotate the drive shaft 558 to rotate the first sprocket 556a. The chain 552 translates the rotational motion of the first sprocket 556a to the second sprocket 556b and thus to the drive member 114. In other embodiments, the drive system 150 can have other suitable components and/or arrangements for rotating the drive member 114. For example, the motor 112 can be positioned in other locations within or external to the drive unit 106, the motor 112 can be coupled directly to the drive member 114, etc.

Figure 6:
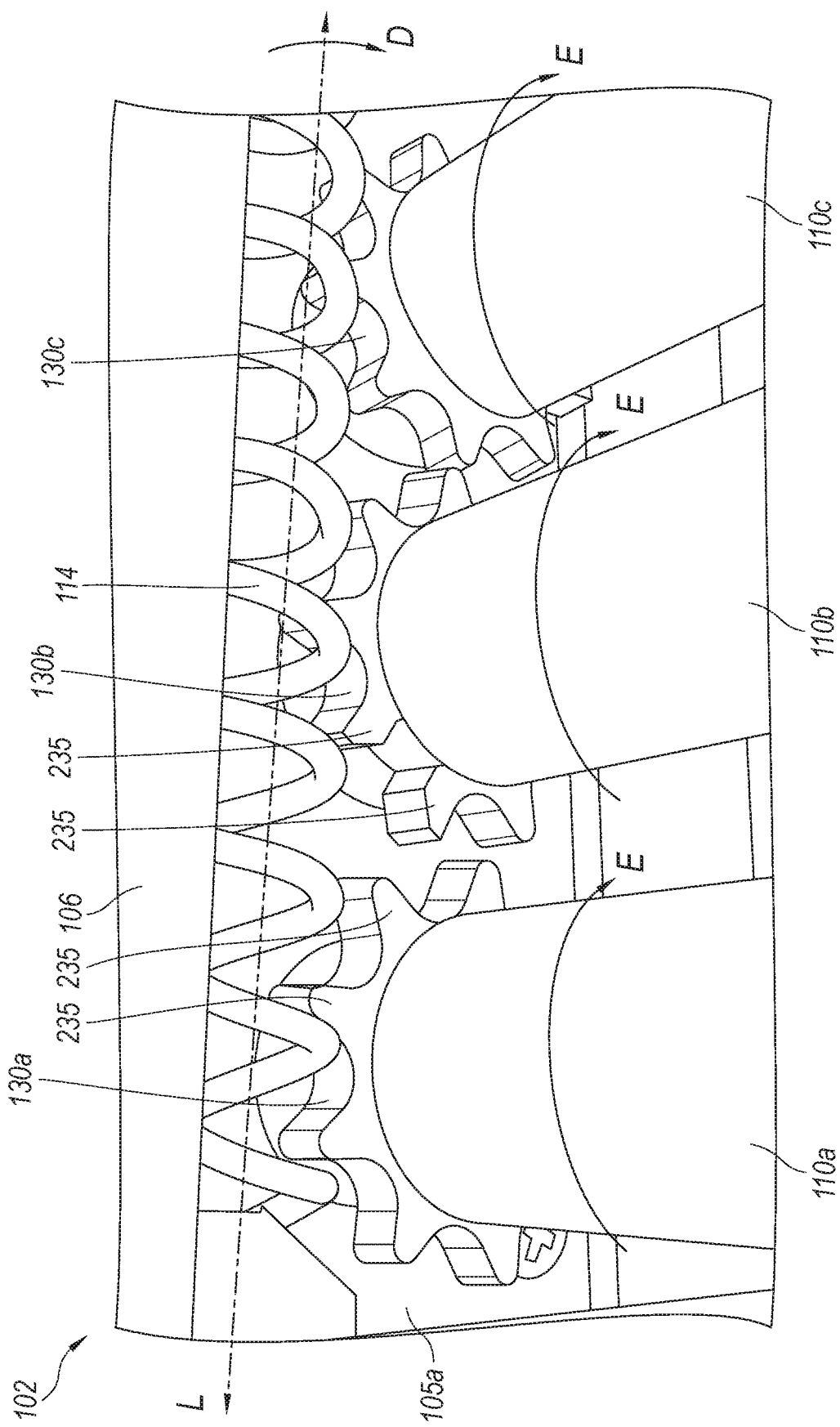
FIG. 6 is an enlarged perspective front view of a portion of a roller assembly of the food heater configured in accordance with embodiments of the present technology.

Rotation of the drive member 114 drives the rollers 110 to rotate. More specifically, FIG. 6 is an enlarged perspective view of the roller assembly 102 illustrating the engagement of the drive member 114 with the sprockets 130 (identified individually as first through third sprockets 130a-130c, respectively) of the first through third rollers 110a-110c in accordance with embodiments of the present technology. In the illustrated embodiment, the drive member 114 is aligned along a longitudinal axis L and engages/meshes with the teeth 235 of the sprockets 130 in a worm drive gear arrangement. Rotation of the drive member 114 about the longitudinal axis L rotates the sprockets 130 and the rollers 110 coupled thereto. For example, rotation of the drive member 114 in a direction D about the longitudinal axis L can drive corresponding rotation of the rollers 110 in a direction E about their individual longitudinal axes. In some embodiments, rotation of the drive member 114 simultaneously pulls the sprockets 130 toward the front wall 105a of drive unit 106. In the illustrated embodiment, the rollers 110 and sprockets 130 have generally the same dimensions as one another such that each of the rollers 110 rotates at approximately the same rate. In this manner, the roller assembly 102 can rotate a food product (e.g., a hot dog) placed in a gap between an adjacent pair of the rollers 110 at a generally constant rate without imparting differential stresses on the food product.

Referring again to FIGS. 5A and 5B, the drive unit 106 can include a power switch 560 and one or more control panels 562 (identified individually as a first control panel 562a and a second control panel 562b) for controlling operation of the food heater 100. In the illustrated embodiment, the first control panel 562a is operably connected to a first controller 564a (e.g., including a Programmable Logic Controller (PLC)) and the second control panel 562b is operably connected to a second controller 564b (e.g., including a PLC). The control panels 562 can include one or more display screens, depressible buttons, touchscreens, and/or other components for displaying information to an operator and/or receiving input from the operator for controlling the operation of the food heater 100.

For example, in some embodiments the first control panel 562a can be operably coupled to the motor 112 and the second control panel 562b can be operably coupled to the heaters 108 (FIG. 1A). Accordingly, the first control panel 562a can display a rotational speed of the rollers 110 (FIG. 1A) and/or can be used to adjust the rotational speed of the rollers 110. Likewise, the second control panel 562b can display a temperature of the rollers 110 and/or can be used to adjust the temperature of the rollers 110. In other embodiments, both of the control panels 562 can be operably coupled to the heaters 108 and configured to control the temperature of the rollers 110. For example, the first control panel 562a can be operably coupled to a first subset of the heaters 108 (e.g., the first through third heaters 108a-108c; FIG. 1A) and the second control panel 562b can be operably coupled to a second subset of the heaters 108 (e.g. the fourth and fifth heaters 108d, e; FIG. 1A).

In some embodiments, the controllers 564 are operable to receive information from the motor 112 and/or the heaters 108 and to automatically control operation thereof. For example, in some embodiments the second controller 564b can receive temperature information from the thermocouples 122 (FIGS. 1C and 1D) of the heaters 108, and can automatically adjust the power supplied to the heating elements 120 (FIGS. 1C and 1D) of the heaters 108 based on the temperature information to adjust the temperature of the rollers 110. In some embodiments, less than all (e.g., one) of the heaters 108 include a thermocouple, and the second controller 564b can control the temperature of all the rollers 110 based on the temperature information received from the thermocouple(s).

Aspects of the control panels 562 and controllers 564 can be embodied in one or more special purpose computers or data processors that are specifically programmed, configured, or constructed to perform one or more of the operations described in detail herein. While aspects of the present technology, such as certain functions, are described as being performed exclusively on a single device, the invention can also be practiced in distributed environments where functions are shared among disparate devices. Although specific circuitry is described above, those or ordinary skill in the art will recognize that a microprocessor-based system could also be used where any logical decisions are configured in software.

Figure 7A:
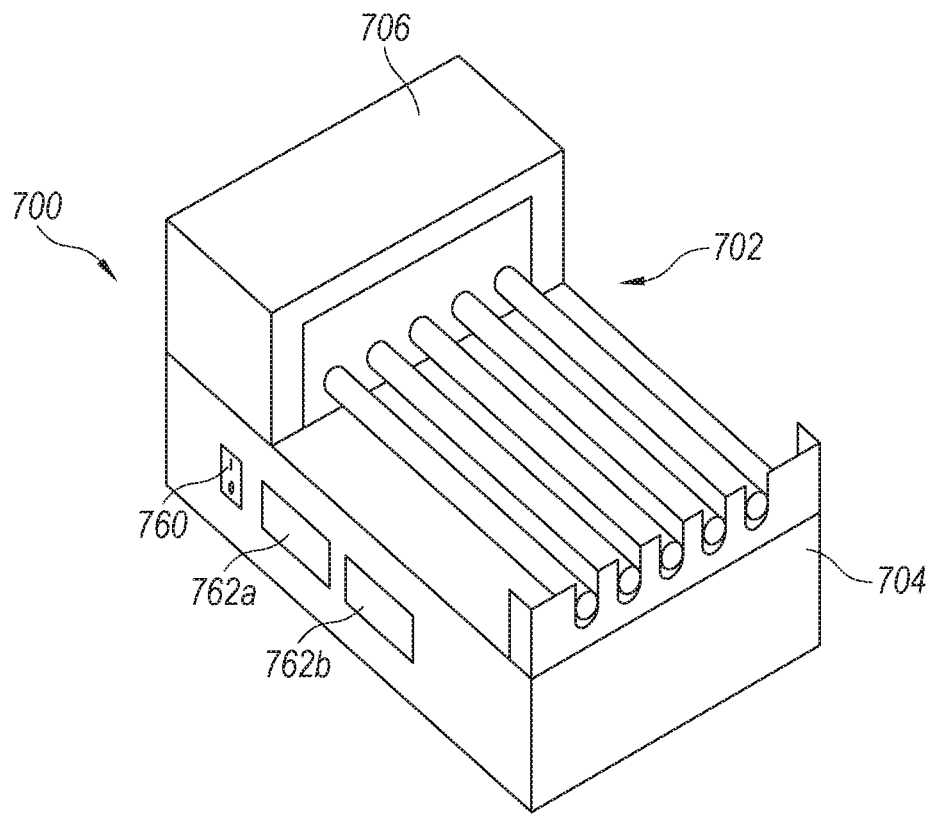
FIGS. 7A and 7B are top isometric views.
Figure 7B:
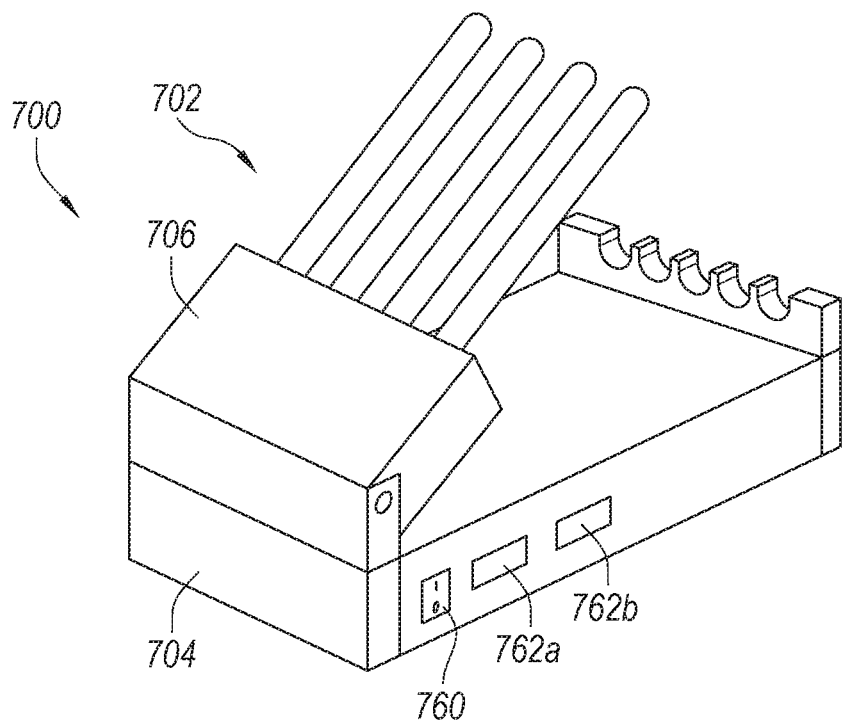
Figure 7C:
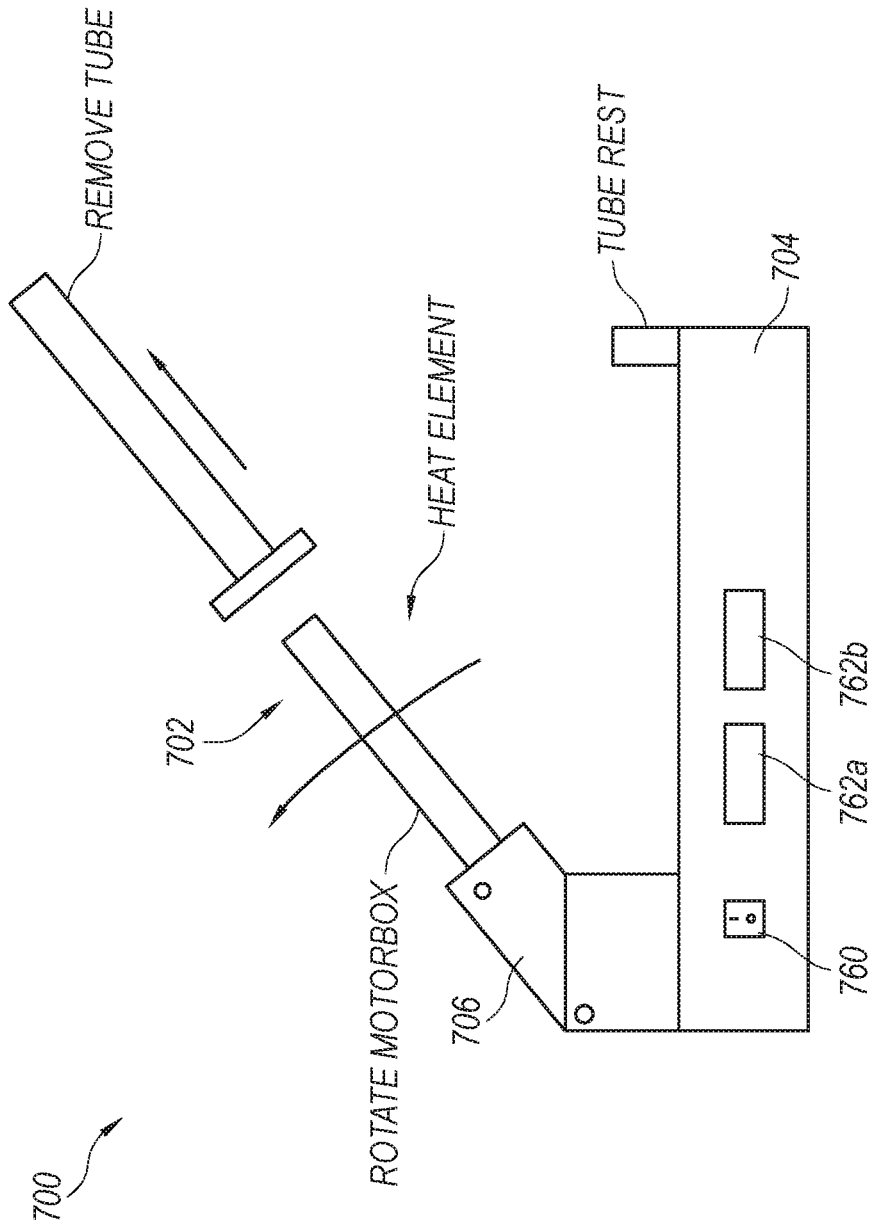
FIG. 7C is a side view, of a food heater configured in accordance with another embodiment of the present technology.

In one aspect of the present technology, all the electronic and mechanical components for controlling the temperature of the heaters 108 and the rotation of the rollers 110 are contained within the drive unit 106. In other embodiments, some or all of these components can be positioned within/on the base 104. For example, FIGS. 7A and 7B are top isometric views of a food heater 700, and FIG. 7C is a side view of the food heater 700 configured in accordance with another embodiment of the present technology. The food heater 700 is generally similar in structure and function to the food heater 100 described in detail above. For example, the food heater 700 includes a roller assembly 702 pivotally coupled to a base 704 and rotatable between a first position (FIG. 7A) and a second position (FIGS. 7B and 7C). In the illustrated embodiment, however, the base 704—rather than a drive unit 706 of the roller assembly 702—includes a power switch 760 for toggling the power to the roller assembly 702 and one or more control panels 762 (identified individually as a first control panel 762a and a second control panel 762b) for controlling operation of the roller assembly 702. The drive unit 706 and the base 704 can be electrically coupled together via a suitable wired or wireless connection.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:
1. A food heater, comprising:
   a base;
   a drive unit pivotally coupled to the base, the drive unit including a motor operably coupled to a drive member;
   a plurality of heaters coupled to the drive unit and projecting outwardly therefrom;

a plurality of rollers configured to be individually positioned over corresponding ones of the heaters such that each of the heaters is positioned within a corresponding roller; and a plurality of sprockets configured to be coupled to corresponding ones of the rollers, wherein each of the sprockets is configured to operably engage the drive member when the rollers are positioned over the corresponding ones of the heaters, wherein the motor is configured to rotate the drive member to thereby rotate the rollers, and wherein the drive unit is rotatable from a first position in which the rollers extend generally parallel to the base to a second position in which the rollers extend at an angle to the base.

2. The food heater of claim 1 wherein the rollers are configured to be manually removable from over the corresponding ones of the heaters without the use of tools when the drive unit is in the second position.

3. The food heater of claim 1 wherein the drive member has an elongate and helical shape.

4. The food heater of claim 1 wherein the heaters are cartridge heaters.

5. The food heater of claim 1 wherein the heaters project farther from the drive unit than the rollers when the rollers are positioned over the corresponding ones of the heaters.

6. The food heater of claim 5 wherein the heaters each include a first end portion coupled to the drive unit and a second end portion opposite the first end portion, wherein the rollers each include a first end portion configured to be coupled to the corresponding one of the sprockets and a second end portion opposite the first end portion, and wherein the food heater further includes a support structure coupled to the base and configured to support the second end portions of the heaters and the second end portions of the rollers in the first position.

7. The food heater of claim 6 wherein the support structure in the first position is configured to support the second end portions of the heaters and the second end portions of the rollers such that the individual rollers are generally coaxially aligned with the corresponding ones of the heaters.

8. The food heater of claim 6 wherein the support structure includes a first portion having a plurality of first arcuate surfaces and a second portion having a plurality of second arcuate surfaces, wherein each of the first arcuate surfaces is configured to support a corresponding one of the second end portions of the heaters, and wherein the second circular surface is configured to support the second end portions of the rollers in the first position.

9. The food heater of claim 8 wherein each of the first arcuate surfaces is concentrically positioned relative to a corresponding one of the second arcuate surfaces.

10. The food heater of claim 8 wherein the first portion is mounted to the base, and wherein the second portion is removably coupled to the first portion.

11. The food heater of claim 1 wherein each of the rollers are configured to be automatically decoupled from the corresponding ones of the sprockets by manually pulling the rollers away from the sprockets.

12. A food heater, comprising:
a base;
a drive unit mounted to the base;
a plurality of rollers releasably coupled to the drive unit, wherein the rollers are pivotable between a first position relative to the base and a second position relative to the base; and a plurality of heaters positioned within corresponding ones of the rollers, wherein the drive unit is configured to rotate the rollers when the rollers are in the first position, and wherein the rollers are configured to be manually removed from over the corresponding ones of the heaters when the rollers are in the second position.

13. The food heater of claim 12, further comprising a plurality of sprockets configured to be coupled to corresponding ones of the rollers, wherein the drive unit includes a motor operably coupled to a worm drive member, wherein the worm drive member is configured to engage the sprockets, and wherein the motor is configured to drive the worm drive member to rotate the sprockets to thereby rotate the rollers.

14. The food heater of claim 13 wherein rotation of the worm drive member is configured to pull the sprockets toward the drive unit.

15. The food heater of claim 13 wherein (a) the rollers each have generally the same dimensions as one another and (b) the sprockets each have generally the same dimensions as one another such that each of the rollers rotates at generally the same rate.

16. The food heater of claim 13 wherein the rollers are configured to be manually removed from over the corresponding ones of the heaters without the use of tools when the drive unit is in the second position, and wherein the sprockets are configured to be decoupled from the corresponding ones of the rollers when the rollers are removed from over the corresponding ones of the heaters.

17. The food heater of claim 12 wherein the base includes a stand configured to operably support the drive unit in the second position.

18. A heater for heating one or more food products, comprising:
a base;
a drive unit pivotally coupled to the base, wherein the drive unit is pivotable between a cooking position and a cleaning position;
a plurality of heaters mounted in parallel to the drive unit;
a plurality of rollers configured to be positioned over corresponding ones of the heaters,
wherein, in the cooking position with the rollers positioned over the corresponding ones of the heaters—
the rollers are spaced apart from another and configured to support the one or more food products between adjacent pairs thereof,
the drive unit is configured rotate the rollers to rotate the one or more food products, and
the heaters are configured to heat the corresponding ones of the rollers to heat the one or more food products; and
wherein, in the cleaning position, the rollers are configured to be removed from over the corresponding ones of the heaters.

19. The heater of claim 18 wherein the number of rollers and the number of heaters is greater than five.

20. The heater of claim 18 wherein the heaters extend generally parallel to the base in the cooking position, and wherein the heaters extend at angle to the base in the cleaning position to permit the removal of the rollers from over the corresponding ones of the heaters.

* * * * *

UNITED STATES PATENT AND TRADEMARK OFFICE
CERTIFICATE OF CORRECTION

PATENT NO. : 11,930,967 B2
APPLICATION NO. : 16/812334
DATED : March 19, 2024
INVENTOR(S) : Charles D. Cretors Page 1 of 1

It is certified that error appears in the above-identified patent and that said Letters Patent is hereby corrected as shown below:

In the Specification

In Column 1, Line 49, delete "FIGS." and insert -- FIG. -- therefor.
In Column 4, Line 41, delete "thereon As" and insert -- thereon. As -- therefor.

Signed and Sealed this
Tenth Day of February, 2026

John A. Squires
*Director of the United States Patent and Trademark Office*